United States Patent [19]

Mayo

[11] 4,373,380

[45] Feb. 15, 1983

[54] TEST TOOL FOR SUB-SEA WELL HEAD HOUSINGS AND METHOD OF TESTING

[76] Inventor: John H. Mayo, 404 Alonda Dr., Lafayette, La. 70503

[21] Appl. No.: 214,674

[22] Filed: Dec. 9, 1980

[51] Int. Cl.³ .......................................... G01M 3/28
[52] U.S. Cl. ................................... 73/40.5 R; 73/49.1
[58] Field of Search .......................... 73/40.5 R, 49.1

[56] References Cited

U.S. PATENT DOCUMENTS

| | | | |
|---|---|---|---|
| 3,165,919 | 1/1965 | Loomis | 73/40.5 R |
| 3,165,920 | 1/1965 | Loomis | 73/40.5 R |
| 3,420,095 | 1/1969 | Brown et al. | 73/40.5 R |
| 3,503,249 | 3/1970 | Dumond | 73/49.1 |
| 3,787,226 | 1/1974 | Iglehart et al. | 73/49.1 X |
| 4,081,990 | 4/1978 | Chatagnier | 73/40.5 R |
| 4,116,044 | 9/1978 | Garrett | 73/40.5 R |
| 4,152,924 | 5/1979 | Mayo | 73/40.5 R |

Primary Examiner—Charles A. Ruehl
Assistant Examiner—Joseph W. Roskos
Attorney, Agent, or Firm—D. Paul Weaver

[57] ABSTRACT

A combined well head housing test tool and well head leak isolation tool is disclosed. Annular seals to test the integrity of well head housing sealing surfaces are energized by pressurized fluid delivered through a dart in the center bore of a tool mandrel and through a radial port of the mandrel to a piston actuator which acts on the seals to energize them. Test fluid under test pressure is separately delivered to a chamber of the tool in communication with the seals through a port formed internally in a combined nut and seal support unit.

11 Claims, 6 Drawing Figures

TEST _____
ACTIVATE ------------

TEST _____
ACTIVATE ------------

TEST TOOL FOR SUB-SEA WELL HEAD HOUSINGS AND METHOD OF TESTING

BACKGROUND OF THE INVENTION

This invention relates broadly to that type of test and isolation tool disclosed in U.S. Pat. No. 4,152,924, issued to John H. Mayo. An object of the invention is to simplify the construction of the test tool through a significant reduction in its number of parts and to render the tool more practical and much more convenient to operate as an isolation tool and for testing well head housing sealing surfaces and the like.

Another object of the invention is to provide a simplified method of testing sealing surfaces on used well head housings so that the latter can be reused with complete safety, the method including the determination and permanent recording of the degree of sealability of such surfaces.

A further object of the invention is to provide a test and isolation tool of the mentioned type having a precision recorder coupled therewith, whereby test results pertaining to a given well head housing are permanently recorded and can be readily compared to industry-wide standard test results obtained by the testing of new housings.

Still another object is to provide convenient and simplified means for bleeding trapped air from the passage of the test tool through which its elastic seals are pressurized or energized in order to prove the reliability of test data.

Other objects and advantages of the invention will become apparent during the course of the following detailed description.

DETAILED DESCRIPTION

Figure 1:
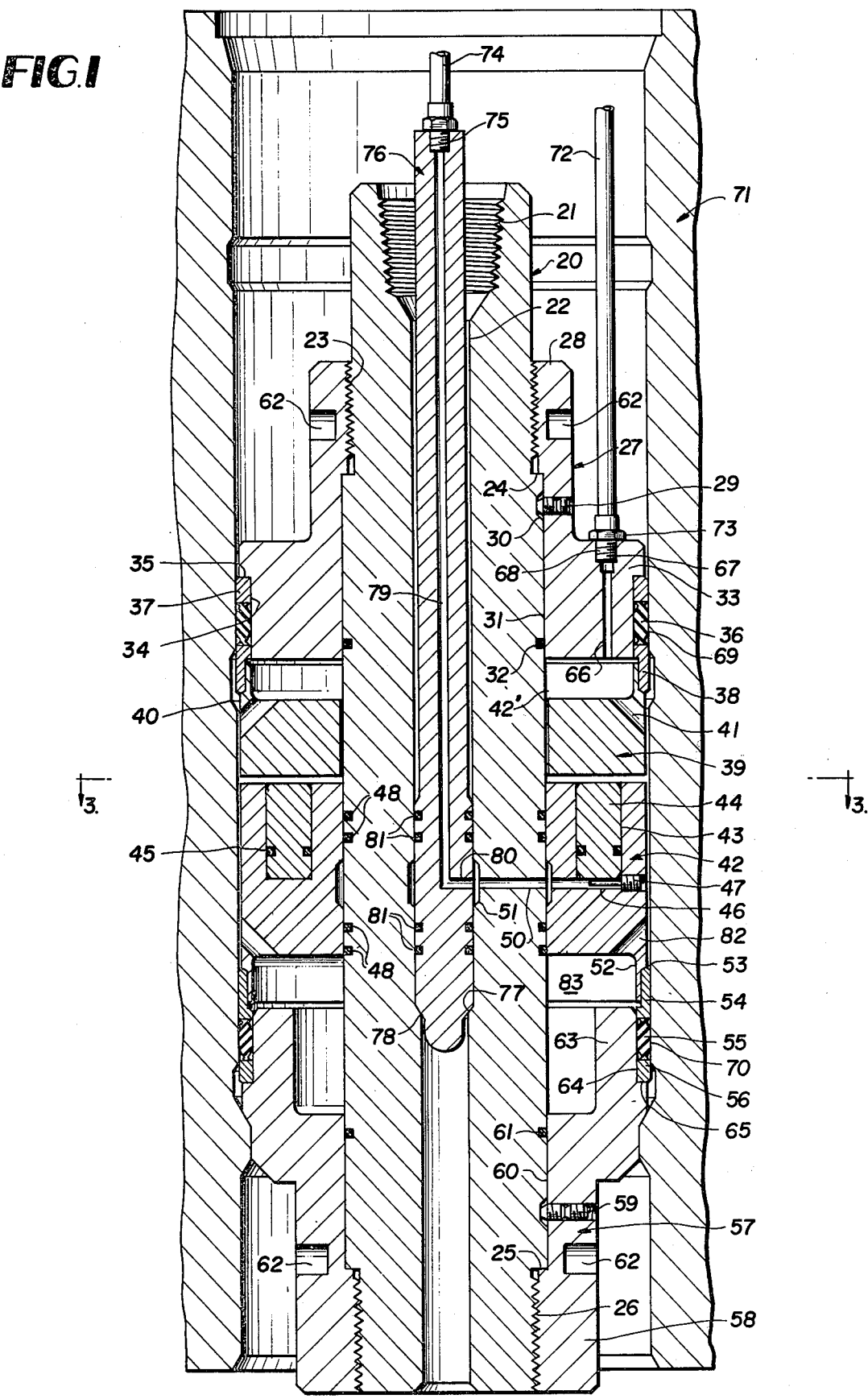
FIG. 1 is a central vertical longitudinal section taken through a test and isolation tool according to the invention and depicting the use of the tool for testing sealing surfaces of a used well head housing and for determining and recording the degree of sealability of such surfaces.

Referring to the drawings in detail wherein like numerals designate like parts, a test and isolation tool according to the invention comprises a center longitudinal mandrel or stem 20 having internal pipe threads 21 in its top end leading to a reduced diameter cylindrical bore 22 which extends entirely through the mandrel 20 centrally and axially and opens through its lower end. The mandrel 20 has external screw-threads 23 near and below its upper end terminating near and above an annular radial shoulder 24. A like shoulder 25 is provided on the mandrel 20 near and above its lower end, and external screw-threads 26 of the same diameter as the threads 23 are provided on the lower end of the mandrel below the shoulder 25.

An upper combined seal support and nut 27 is mounted on the exterior of the mandrel 20 and includes an internally threaded nut extension 28 engaged with the screw-threads 23 and solidly abutting the shoulder 24 and being locked in assembled relationship with the mandrel 20 by a locking set screw 29 whose inner tip is engaged within a shallow recess 30 formed in the exterior of the mandrel. The cylindrical bore 31 of element 27 is sealed in a pressure tight manner relative to the periphery of the mandrel by an elastic ring seal 32 or equivalent means.

The element 27 further includes an enlarged diameter lower end portion 33 having an external annular recess 34 including an annular upper shoulder 35. Within the recess 34 in surrounding relationship to the portion 33 is an elastic seal 36 disposed between an upper rigid annulus 37 and a lower rigid annulus 38. The upper annulus 37 solidly abuts the shoulder 35. The seal 36 can be constructed according to the teachings of U.S. Pat. No. 4,152,924.

Below the combined seal support and nut 27 in concentric surrounding relationship to the mandrel 20 is an actuator or energizer ring 39 for the elastic seal 36 including an annular seat 40 engaging the lower end of rigid annulus 38. The ring 39 has at least one wash-out hole 41 formed therethrough on an angle as shown so that mud and other debris can be flushed from the chamber 42' between the elements 27 and 39 and surrounding the mandrel 20.

Below the ring 39 in surrounding relationship to the mandrel 20 is a compression head or ring 42 having an interior annular chamber 43 receiving therein an annular piston 44 having a ring seal 45.

A radial port 46 is formed through the ring 42 and intersects the bottom of chamber 43. The outer end of port 46 is closed by a retractable air bleed plug 47 by means of which air trapped in the system can be conveniently bled off followed by full closing of the plug 47.

Above and below the radial port 46, the bore of ring 42 is sealed with respect to mandrel 20 by pairs of ring seals 48. The inner end of port 46 opens into a shallow annular recess 49 formed in the bore of ring 42 and extending somewhat above and below the level of the port 46. This recess registers with a relatively fixed radial port 50 formed through the wall of mandrel 20, the latter having a shallow interior annular recess 51 formed in its bore 22 and communicating with the port 50.

The head or ring 42 includes a lower end skirt 52 having an external annular seat 53 for an upper rigid annulus 54 engaging a lower elastic seal 55 similar to the seal 36, such seal being engaged by a lower rigid annulus 56.

On the lower end of the mandrel 20, a combined seal support and nut 57 similar to the combined element 27 is provided. The element 57 includes a lower end nut portion 58 having threaded engagement with the screw-threads 26 and abutting the shoulder 25. A locking set screw 59 identical to the set screw 29 is utilized to lock the element 57 in assembled relationship with the mandrel 20. The element 57 has its bore 60 sealed with respect to the mandrel 20 by an elastic ring seal 61. Both of the elements 27 and 57 are equipped with external radial openings 62 to receive a suitable tool or bar for turning the two elements toward and from engagement with the shoulders 24 and 25.

The element 57 includes a seal supporting annular head 63 at its upper end spaced from the mandrel 20 and having an external annular recess 64 to receive the seal 55 and annuli 54 and 56. The rigid annulus 56 abuts and is supported by an annular shoulder 65 at the bottom of recess 64.

While the annular piston 44 is shown separated from the ring 39 in some cases the top of the piston 44 may be attached to the seal energized ring 39 without changing the mode of operation, yet to be described.

A test pressure fluid inlet port 66 is formed longitudinally through the seal support portion 33 of element 27 and leads to the chamber 42'. A threaded enlarged inlet 67 at the top of port 66 can receive a closure plug 68 when the tool is being used as an isolation tool. When the tool is employed in another mode to test the sealability of internal surfaces 69 and 70 of a used well head housing 71, pressurized test fluid is delivered to the port 66 through a suitable hose 72 having an end fitting 73 threadedly engaged in the inlet 67.

Similarly, pressurized fluid to energize or pressurize the seals 36 and 55 is delivered through a hose 74 having an end adapter 75 to the bore of a conventional down hole dart 76 having a landing shoulder 77 near its lower end engageable with a coacting inclined annular landing surface 78 of the mandrel 20. The longitudinal bore 79 of the dart 76 leads to a single radial passage 80 of the dart near and above its lower end adapted to register with the radial port 50 of the mandrel when the down hole dart is seated on the landing surface 78. The dart is sealed with respect to the mandrel bore 22 by elastic ring seals 81 somewhat above and below the radial passage 80.

It should also be noted that the head or ring 42 has an angled wash-out hole 82 similar to the hole 41 leading from the exterior of the tool into the chamber 83 between the two elements 42 and 57. The two chambers 42' and 83 communicate and therefore constitute a single pressurized test fluid chamber receiving pressurized test fluid through the passage 66 from hose 72. This test fluid chamber, it can be noted, is effectively isolated by seals from the radial ports 50 and 46 and from the dart 76. These latter components receive fluid through the hose 74 and dart 76 at a different pressure to displace the piston 44 and thus energize or pressurize the two seals 36 and 55 simultaneously. During such operation, the piston 44 is displaced upwardly against the ring 39 to drive the latter upwardly, and the reaction force resulting from this drives the ring or head 42 downwardly simultaneously whereby both seals 36 and 55 become energized. This mode of operation is substantially in accordance with U.S. Pat. No. 4,152,924.

The tool, above described, when employed for testing the sealing surfaces of well head housings, is used with a portable dual pressure recorder 84 such as a Series M252A Pressure Recorder manufactured by Martin-Decker Company, 1928 S. Grand Ave., Santa Ana, Calif. 92705. This conventional recorder is a dual pen recorder which produces in graphic form on a circular ruled chart continuous indications of seal energizing and test pressures over a period of time during rotation of the chart by a clock mechanism embodied in the recorder. In this manner, a permanent record of the pressure test of any used well head housing 71 is produced showing an incremental build-up of pressures from zero to any selected maximum pressures and also showing graphically and ability of the well head housing sealing surface to hold the test pressure without leakage over a chosen period of time, and, most importantly, showing the degree of sealability of the well head housing surface, as will be further discussed.

Figure 4:
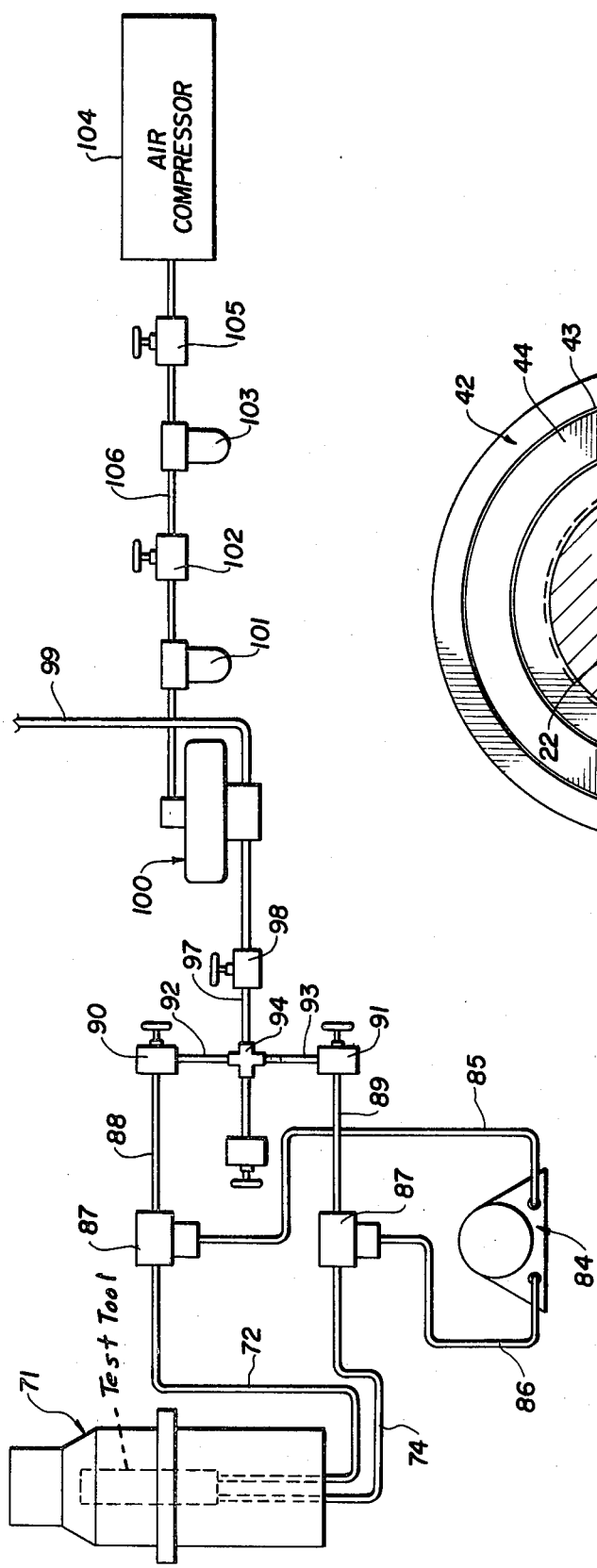
FIG. 4 is a flow chart showing equipment used in conjunction with the test tool and recorder in the practice of the method whereby the degree of sealability of well head housing surfaces is established with precision.

The recorder 84 as depicted in FIG. 4 records test pressure and pressure which activates or energizes the two seals 36 and 55 by measuring the pressure of oil in two lines 85 and 86 leading from conventional diaphragm separator or protector units 87 and connected with oil pressure inlets of the recorder. The separator units 87 are part of the standard Martin-Decker Company Series M252A recorder equipment. Their purpose is to separate the oil whose pressure activates the recorder from the other working fluid in the system, such as city water.

As shown in FIG. 4, the two units 87 receive water under test pressure and seal activating pressure, respectively, through two lines 88 and 89 and deliver such pressurized water to the tool through the aforementioned lines or hoses 72 and 74. Simultaneously, by operation of the internal diaphragm means, not shown, the units 87 through lines 85 and 86 deliver pressurized clean oil at test pressure and seal activating pressure to the dual pen recorder 84. The pressures in the lines 72 and 85 and 74 and 86 will be identical.

Water under test pressure to the line 88 and under seal activating pressure to the line 89 is under control of two adjustable needle valves 90 and 91 each having a pressure gage. Such valves are manufactured by Autoclave Engineers, Eire, Pa. 16512, High Pressure Series 30VM or 60VM, or any equivalent valve. The valves 90 and 91 independently receive pressurized water through lines 92 and 93 from a dual-T 94 connected by a line 95 with a bleed valve 96 by means of which air can be bled from the system. The dual-T 94 is fed water from a line 97 leading from a manual isolation valve 98. The two valves 96 and 98 may be of the same type and manufacture as the valves 90 and 91.

Upstream from the valve 98, city water is supplied to the system through a line 99 connected with the piston chamber of a diaphragm-piston pump 100, such as a Model S-216-C, Hydraulic Pump Air Driven, manufactured by Teledyne Sprague Engineering, P.O. Box 630, Gardena, Calif. 90247, or an equivalent pump. Upstream from the pump 100, a conventional lubricator unit 101 is provided and preceding this unit is an adjustable pressure regulator 102, such as a Series 600000 manufactured by Lincoln St. Louis, a division of McNeil Corporation, 4010 Goodfellow Blvd., St. Louis, Mo. 63120. Ahead of the regulator 102 is a trap or filter 103 preceded by an air compressor 104 having a pressure regulator 105. A compressed air line 106 leads from the compressor 104 through the elements 105, 103, 102 and 101 to the diaphragm chamber of the pump 100.

The procedure for testing the integrity and for determining with precision the degree of sealability of the sealing surfaces on a used well head housing 71 is as follows.

With the hoses 72 and 74 connected to the test tool as shown and described, the air compressor 104 operating, and the pressure regulators properly adjusted, air trapped in the system can be bled off by removal of the plug 47 while pressurized water is delivered through the hose 74 and dart 76 to ports 50 and 46. To accomplish this bleeding procedure, the valves 98 and 91 are opened and the valves 90 and 96 are closed. Even prior to this air bleeding operation, further air bleeding can take place by opening the bleed valve 96 and reclosing it. The air bleed plug 47 is reseated when the system appears free of air bubbles in the pressurized water. At this point, the actual test procedure can commence.

Figure 5:
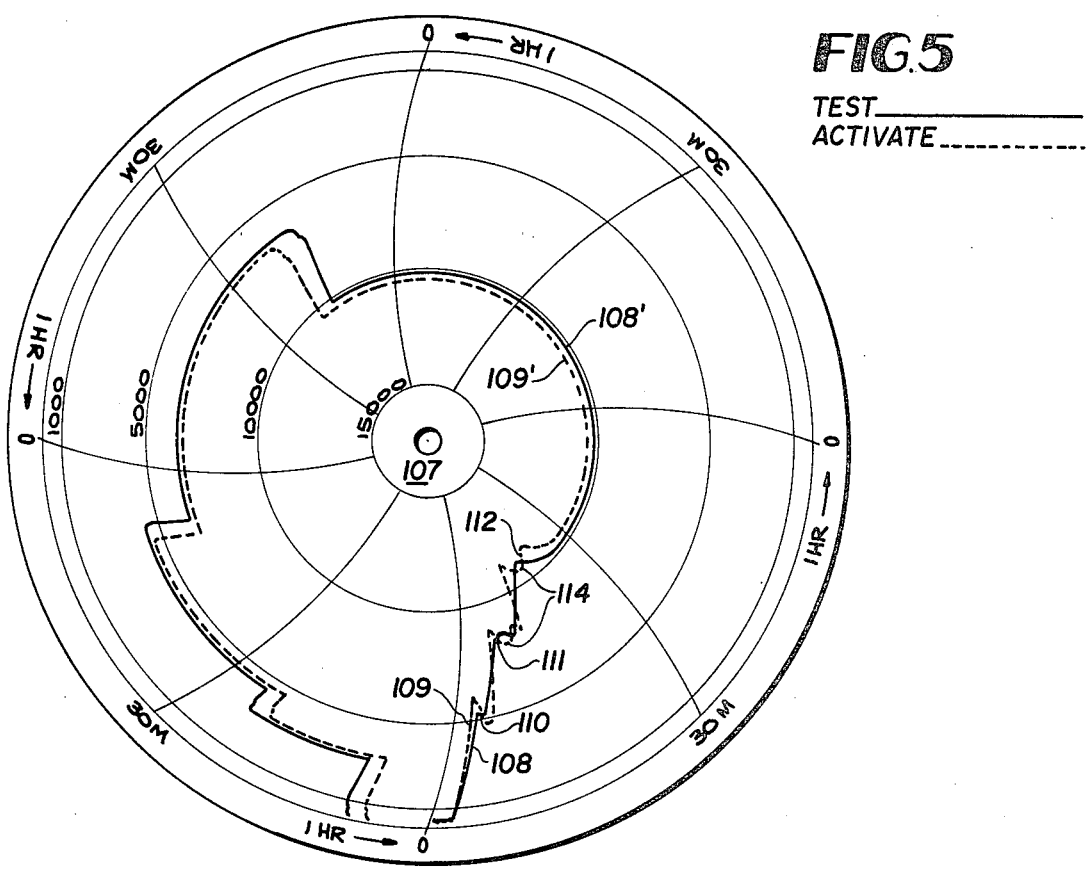
FIGS. 5 and 6 are views of charts showing test results obtained by use of the tool and comparative results obtained by testing newly manufactured well head housings.

With reference to the test chart 107 in FIG. 5, the two ink pen graphs 108 and 109 denote test pressure applied to the tool through entrance port 66 and seal pressurizing or activating pressure applied through the dart 76 and associated ports 50 and 46. As shown in the chart 107, the two pressures are built-up in steps or increments from 0 psi to whatever maximum test pressure is chosen for the particular test, such as 10,000 psi in the chosen illustration. After the incremental build-up of pressures, they are maintained for a substantial time interval as shown by the circular portions 109' and 108' of the two graphs. At the end of this period, the two pressures are allowed to return in steps or increments to the zero point.

Figure 6:
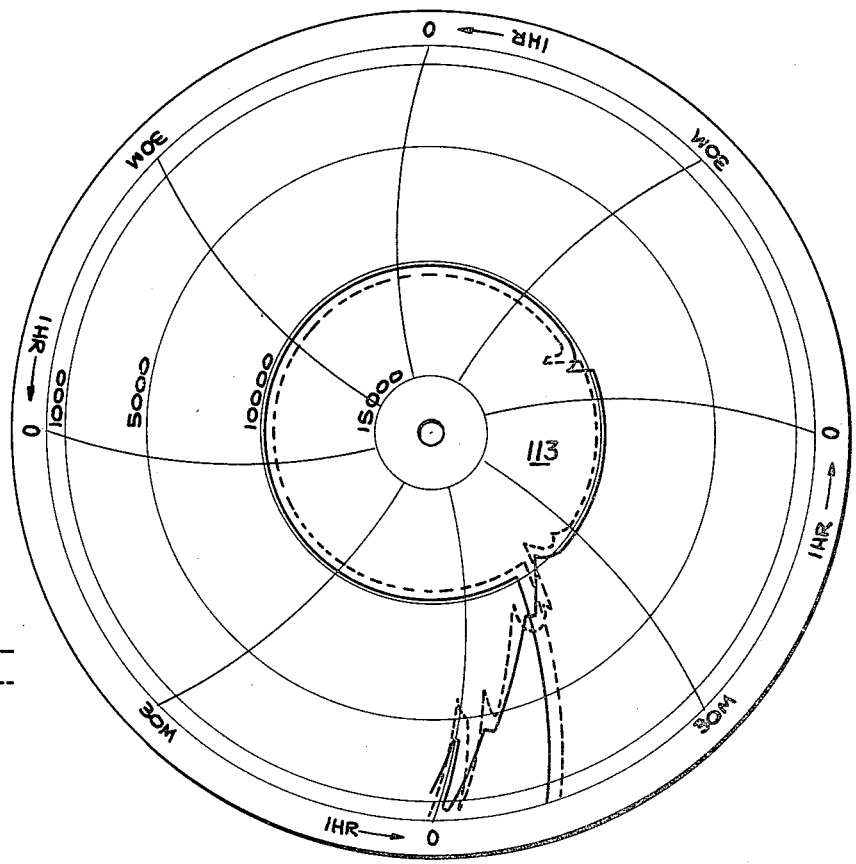

Further concerning the two graphs of seal activating and test pressures, the crossing points 110, 111 and 112 denote the points where leakage around the seals 36 and 55 will begin after a certain seal energizing pressure is created in the test and held constant, following which the test pressure through the port 26 is increased. This degree of test pressure is also held constant until a condition of equilibrium or balance takes place at which instant the leakage around the seals will stop. At this point, the degree of sealability of the surfaces of the used well head housing 71 is determined, and is graphically illustrated by the space between the two arcuate graph portions 108' and 109'. In practice, this degree of sealability in the case of an acceptable and safely reusable well head housing will be approximately 450 psi. By comparison, with the second chart 113 shown in FIG. 6, it can be seen that the test results including the important degree of sealability of the housing surface undergoing testing compare very favorably with the test results for a newly manufactured well head housing which has never been used.

With further reference to the chart 107, the dropback portions or bulges 114 in the seal activating pressure graph 109 represent air trapped in the system. In general, the graphs show that seal activating pressure and test pressure follow each other very closely throughout an entire test period, such as one hour. Should the degree of sealability in any case exceed reasonable limits, then that particular used sub-sea well head housing will be discarded for safety reasons.

Again referring to FIG. 4, in carrying out the test method reflected on the chart 107, it is merely necessary for an operator of the system to manipulate the two valves 90 and 91 to incrementally increase test pressure and seal activating pressure and to close the valves when it is desired to hold the pressures constant while equilibrium takes place evidenced by the ending of any leakage around the seals 36 and 55 which will begin when a certain seal activating pressure is established through the valve 91 and held constant while test pressure through the valve 90 is increased to a level above the intersection point 110, 111, etc. on the two graphs.

As described in U.S. Pat. No. 4,152,924, the tool can serve additionally as an isolation tool to isolate the location of a leak in any sub-sea well head. This application of the tool is shown in FIGS. 7 and 8 in the prior patent and is similarly shown in FIG. 2 of this application.

Figure 2:
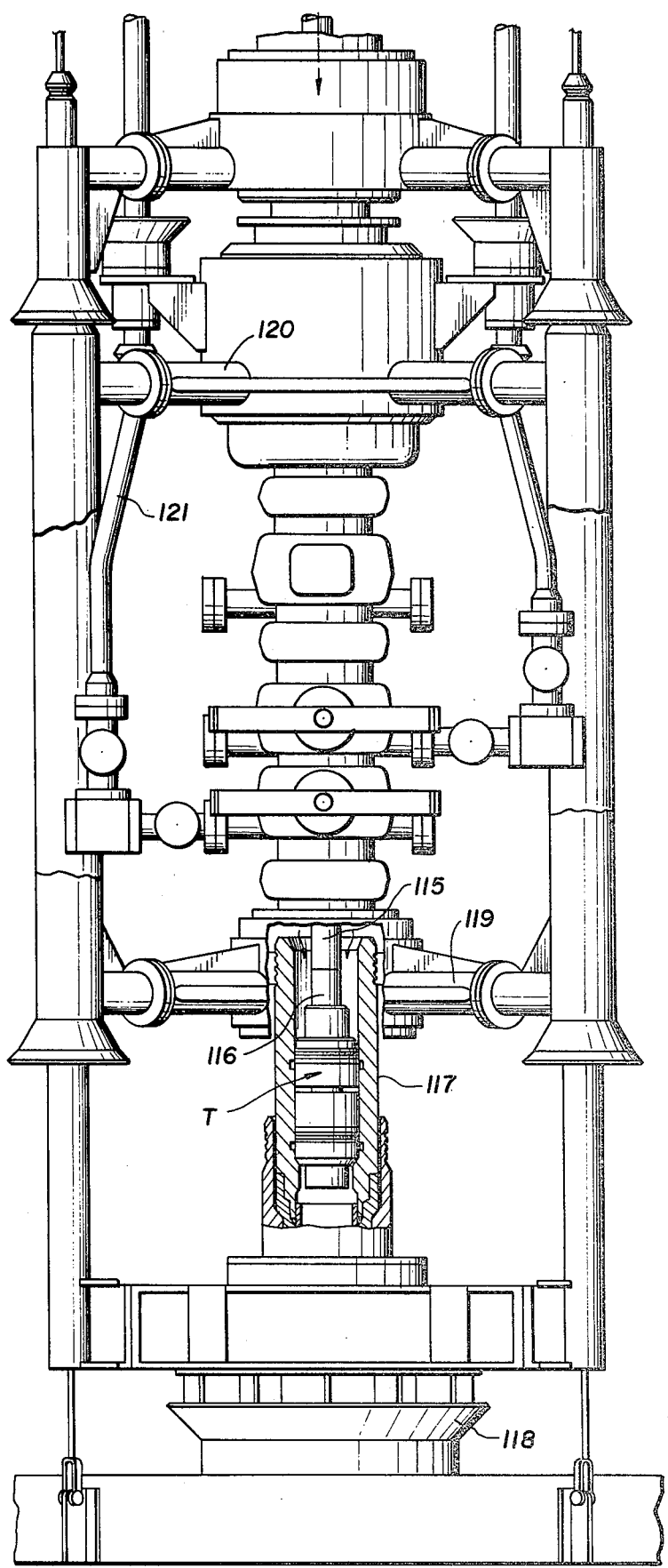
FIG. 2 is a fragmentary side elevation, partly in cross section, depicting the use of the tool for isolating a leak in a well head.
Figure 3:
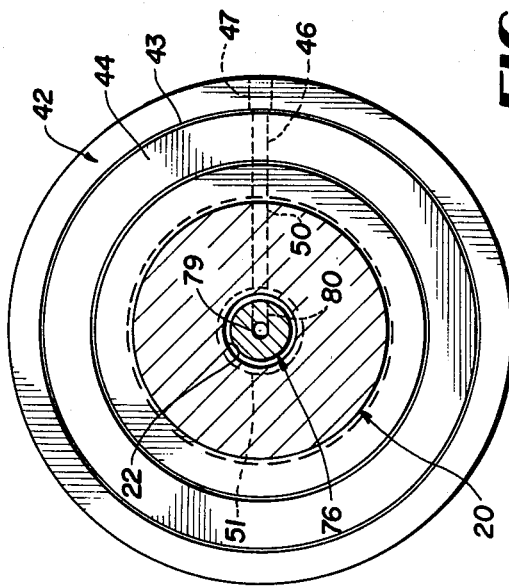
FIG. 3 is a horizontal section taken on line 3—3 of FIG. 1.

As shown, the too designated T in FIG. 2 is run on a drill pipe 115 with the lowermost pipe section 116 engaged threadedly in the pipe threads 21 at the top of mandrel 20. The tool is positioned in a well head housing 117 above guide base assembly 118 and adjacent to lower BOP guide frame 119. The middle BOP guide frame is indicated in FIG. 2 by the numeral 120 and the customary choke and kill line is shown at 121.

In order to use the tool as an isolation tool, the test pressure hose 72 is removed and the threaded plug 68 is used to plug the entrance of the port 66. Also, the dart 76 is not placed in the tool on the landing surface 78 until after the tool T is resting in the casing hanger in the well, FIG. 2. At such time, the dart 76 is installed and through it pressure is built up to energize or activate the seals 36 and 55. Following this, test pressure which may be full well head pressure is delivered through the choke and kill line 121 directly into the open top of well head housing 117. If the top seal 36 holds under this pressure without leakage, it is clear that a detected leak is somewhere in the BOP equipment and not in the seal. On the other hand, if the top seal 36 should leak during the isolation test, it can be replaced.

It should also be mentioned that in some instances where the tool is being used to test well head housings, the top seal 36 may be located above and outside of the housing. In such cases, the top seal is removed prior to the test and replaced by a blank metal insert or ring to prevent the top seal from disintegrating under the extreme test pressure.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of testing a sealing surface to determine the degree of sealability of the surface, comprising pressure activating a seal in contact with said surface under a selected degree of activating pressure and maintaining the activating pressure constant for an interval, applying a test pressure to said surface and seal at a level of pressure above said activating pressure sufficient to cause leakage of fluid between said surface and seal, holding the test pressure constant for an interval while allowing a condition of pressure equilibrium between said activating and test pressures to occur evidenced by the stopping of leakage between said surface and seal, and recording the equilibrium pressure to establish the degree of sealability of said surface.

2. The method of claim 1, and increasing said activating and test pressures in increments over a range of pressures from zero to a chosen maximum test pressure, maintaining the activating and test pressures constant for an interval at each increment to enable said pressure equilibrium to occur at each increment, maintaining said activating and test pressures constant for an extended interval of time following the pressure equilibrium at the most elevated increment of activating and test pressures, reducing said pressures back to zero and permanently recording all of said pressures on a chart.

3. A test and isolation tool for sub-sea wells comprising a center mandrel having an axial bore and a lateral passage leading from said bore through the side wall of the mandrel, a dart sealingly engaged in the bore of the mandrel and having a fluid passage communicating with said lateral passage to deliver pressurized seal activating fluid to the lateral passage, a compression ring surrounding the mandrel and sealed relative thereto above and below said lateral passage and having a chamber in communication with the lateral passage, a single unitary piston in said chamber of the compression ring, the chamber and piston being annular, one piece nut and seal support units surrounding the mandrel near its opposite ends and having threaded engagement therewith and being disposed on opposite sides of the compression ring to define therewith a chamber for test fluid between a pair of seals on said nut and seal support units, separate means to deliver pressurized test fluid to said chamber including a port formed through the side wall of one of said nut and seal support units, said last-named port directly communicating with said chamber and being spaced from and outside of said mandrel, elastic seals on the one piece nut and seal support units, and seal energizing means responding to displacement of said piston under influence of said seal activating fluid and moving axially of said mandrel in opposite directions toward said seals and being engaged therewith.

4. A test and isolation tool for sub-sea wells as defined in claim 3, and said seal energizing means including a part carried by said compression ring and engaging a coacting part of one seal, and an independently movable ring member surrounding said mandrel between the other seal and the compression ring and having a part engaging a coacting part of the other seal.

5. A test and isolation tool for sub-sea wells as defined in claim 4, and a fluid passage means through said ring member and compression ring for placing axially separated portions of said chamber for a test fluid in communication.

6. A test and isolation tool for sub-sea wells as defined in claim 3, and pressure recorder means to record pressures of the seal activating and test fluids and having connections with said dart and said separate means.

7. A test and isolation tool for sub-sea wells comprising a mandrel having a bore and a lateral passage for seal activating fluid leading from the bore, means for delivering pressurized seal activating fluid through said bore into said lateral passage comprising a down-hole dart insertable within said bore and having a fluid passage adapted to register with said lateral passage, a compression ring surrounding the mandrel and having sealed engagement with the exterior of the mandrel on opposite sides of the lateral passage and having an annular chamber in communication with said passage, a single annular piston within the annular chamber of the compression ring, nut and seal support units surrounding the mandrel near opposite ends thereof and having threaded engagement therewith and being disposed on opposite sides of said compression ring in axially spaced relation thereto to define a chamber for a test fluid, fluid passage means in one of said nut and seal support units through which pressurized test fluid is delivered into said last-named chamber, elastic seal structures on the nut and seal support units, and seal actuator means responding to displacement of said piston under influence of said pressurized seal activating fluid and moving axially of said mandrel in opposite directions toward said seals and being connected with said seals.

8. A test and isolation tool for sub-sea wells comprising a mandrel having a bore and a lateral passage for seal activating fluid leading from the bore, means for delivering pressurized seal activating fluid through said bore into said lateral passage, a compression ring surrounding the mandrel and having sealed engagement with the exterior of the mandrel on opposite sides of the lateral passage and having an annular chamber in communication with said passage, a single annular piston within the annular chamber of the compression ring, nut and seal support units surrounding the mandrel near opposite ends thereof and having threaded engagement therewith and being disposed on opposite sides of said compression ring in axially spaced relation thereto to define a chamber for a test fluid, fluid passage means in one of said nut and seal support units through which pressurized test fluid is delivered into said last-named chamber, elastic seal structures on the nut and seal support units, seal actuator means responding to displacement of said piston under influences of said pressurized seal activating fluid and moving axially of said mandrel in opposite directions toward said seals and being connected with said seals, said compression ring having a lateral passage in registration with the lateral passage of the mandrel and leading into one end of said annular chamber adjacent to one end of said piston, the lateral passage of the compression ring opening through the exterior surface of the compression ring, and a removable air bleed closure plug for the exterior end of the lateral passage of said compression ring.

9. A test and isolation tool for sub-sea wells comprising a central mandrel having a bore and a radial passage leading from the bore, a down-hole dart positioned in said bore and having a passage for pressurized seal activating fluid in registration with the radial port, whereby such fluid from an external source can be delivered to the tool, first and second relatively axially movable ring members on the mandrel, one ring member having a chamber in communication with said radial passage, a single annular piston in said chamber operable in response to delivery of pressurized seal activating fluid to the chamber from the radial passage to cause axial movement of the ring members away from each other, one piece nut and seal support members on the mandrel near its opposite ends and being in spaced axially opposed relationship to said first and second relatively movable ring members, annular elastic seals on the one piece nut and seal support members and being engaged with said ring members, and separate means externally of the mandrel to deliver pressurized test fluid from an external source to an internal chamber of the tool in communication with said seals, said separate means including a fluid passage formed through the wall of one of said one piece nut and seal supporting members and being in direct communication with the last-named chamber of the tool.

10. A test and isolation tool for sub-sea wells comprising a tool body insertable into a well head housing and carrying seals adapted to engage spaced sealing surfaces on the interior of the housing, first fluid pressure means connected with the tool body to expand said seals into sealing engagement with said surfaces of the housing, second fluid pressure means to apply test pressure to said seals and housing surfaces within the tool body, dual pressure recorder means connected to the first and second fluid pressure means, and the first and second fluid pressure means comprising flow divider means and a fluid pump means common to and connected with the flow divider means.

11. A test and isolation tool for sub-sea wells as defined in claim 10, and said fluid pump means comprising a gas operated liquid pump, and an air compressor and air pressure regulator means upstream from and connected with said pump means.

* * * * *